United States Patent [19]

Tague et al.

[11] Patent Number: 4,462,072
[45] Date of Patent: Jul. 24, 1984

[54] CLOCK SYSTEM HAVING A STALL CAPABILITY TO ENABLE PROCESSING OF ERRORS

[75] Inventors: Steven A. Tague, Billerica; Virendra S. Negi, Pepperell, both of Mass.

[73] Assignee: Honeywell Information Systems Inc., Waltham, Mass.

[21] Appl. No.: 250,810

[22] Filed: Apr. 3, 1981

[51] Int. Cl.³ .......................... G06F 7/00; G06F 11/00
[52] U.S. Cl. .................................................. 364/200
[58] Field of Search ............................... 364/200, 900

[56] References Cited

U.S. PATENT DOCUMENTS

4,021,784  5/1977  Kimlinger .
4,348,743  9/1982  Dozier ................................. 364/900

Primary Examiner—Gareth D. Shaw
Assistant Examiner—John G. Mills
Attorney, Agent, or Firm—George Grayson; Nicholas Prasinos

[57] ABSTRACT

A microprogrammed commercial instruction processor (CIP) is placed in a stall mode during the transfer of information between the CIP and main memory by stalling a free running clock signal. When the transfer of information is completed, the free running clock cycles. If main memory indicates an error condition, then the free running clock signal is again stalled after one cycle to allow the firmware in the CIP to process the error.

8 Claims, 6 Drawing Figures

CLOCK SYSTEM HAVING A STALL CAPABILITY TO ENABLE PROCESSING OF ERRORS

RELATED APPLICATIONS

The following U.S. patent applications filed on an even date and assigned to the same assignee as the instant application are related to the instant application and are incorporated by reference.

1. "Apparatus for Setting the Basic Clock Timing in a Data Processing System" by Steven A. Tague and Virendra S. Negi, filed on Apr. 3, 1981 and having U.S. Ser. No. 250,823.

2. "Diagnostic Testing of the Data Path in a Microprogrammed Data Processor" by Steven A. Tague and Virendra S. Negi, issued on Oct. 18, 1983 and having U.S. Pat. No. 4,410,984.

The following U.S. patent applications assigned to the same assignee as the instant application are related to the instant application and are incorporated by reference.

3. "A Data Processor Performing a Decimal Multiply Operation Using a Read Only Memory" by Steven A. Tague and Virendra S. Negi, issued on June 28, 1983 and having U.S. Pat. No. 4,390,961.

4. "A Data Processor Having Units Carry and Tens Carry Apparatus Supporting a Decimal Multiply Operation" by Virendra S. Negi and Steven A. Tague, filed on Dec. 24, 1980 and having U.S. Ser. No. 219,810.

5. "A Data Processor Having Carry Apparatus Supporting a Decimal Divide Operation" by Steven A. Tague and Virendra S. Negi, issued on May 17, 1983 and having U.S. Pat. No. 4,384,341.

6. "A Data Processor Using Read Only Memories for Optimizing Main Memory Access and Identifying the Starting Position of an Operand" by Steven A. Tague and Virendra S. Negi, filed on Dec. 24, 1980 and having U.S. Ser. No. 219,809.

7. "A Data Processor Having Apparatus for Controlling the Selection of Decimal Digits of an Operand When Executing Decimal Arithmetic Instructions" by Steven A. Tague and Virendra S. Negi, issued on May 17, 1983 and having U.S. Pat. No. 4,384,340.

8. "A Data Processor Using a Read Only Memory for Selecting a Part of a Register Into Which Data is Written" by Steven A. Tague and Virendra S. Negi, filed on Dec. 24, 1980 and having U.S. Ser. No. 220,219.

BACKGROUND OF THE INVENTION

1. Field of the Invention

This invention relates generally to data processing systems and more particularly to a clocking system which is stalled to allow reliable access of firmware error routines without a time penalty to non-error cases.

2. Description of the Prior Art

In data processing systems, the speed of operation is normally controlled by a clock system. A typical clock system generates a square wave with a time period to match the speed of the logical elements of the data processing system, and in the same system to match the speed of the information being transferred between peripheral subsystems and a central processor unit (CPU) of the data processing system.

U.S. Pat. No. 4,105,978 entitled "Stretch and Stall Clock" describes a system clock mechanism which can be stretched; that is, generate pulses at more than one rate to match the speed of the CPU to the data rate of the peripheral subsystem. The system clock mechanism may be stalled and restarted immediately upon request to satisfy the requirements of some asynchronous operations.

U.S. Pat. No. 4,134,073 entitled "Clock System Having Adaptive Synchronous Feature" describes apparatus to stall the system clock in the CPU during the transfer of information between the CPU and main memory.

U.S. Pat. No. 4,241,418 entitled "Clock System Having a Dynamically Selectable Clock Period" describes apparatus for generating one of four possible predetermined clock cycle periods. The apparatus also starts up the clock cycle in a minimum period of time after the removal of a stall high signal or a stall low signal.

As performance of data processing systems is improved by the use of faster logic circuits, the clock cycle periods used in the CPU become shorter requiring components with closer tolerance. An example of the clock system providing for the adjustment of the clock frequency is described in U.S. Pat. No. 3,775,696 entitled "Synchronous Digital System Having a Multi-Speed Logic Clock Oscillator".

U.S. application Ser. No. 224,727 entitled "Adjustable Clock System Having a Dynamically Selectable Clock Period" describes apparatus for permitting the CPU clock system to generate a train of clock pulses with each clock cycle period being of a predetermined cycle time but independent of the cycle time of the preceding or succeeding clock cycle, thereby tailoring each clock cycle period to a particular microprogram step thereby maximizing the throughput of the CPU. Also a number of stall functions are described including those which are asynchronous with the firmware operation and those which are controlled by the firmware.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is a primary object of the invention to have a microprogrammed commercial instruction processor with an improved clocking system.

It is an object of the invention to have an improved clocking system capable of stalling the commercial instruction processor.

It is another object of the invention to have an improved clocking system capable of stalling the commercial instruction processor during the transfer of information between the commercial instruction processor and a main memory.

It is still another object of the invention to have an improved clocking system capable of stalling the commercial instruction processor after the transfer of information when the main memory indicates an error condition to the commercial instruction processor.

SUMMARY OF THE INVENTION

A commercial instruction processor (CIP) system clock logic includes a 40 nanosecond cycle time clock signal MCLOCK− which clocks a plurality of timing flops to generate a plurality of timing signals.

A request signal CIREQT+ is generated by a control store signal to indicate that a transfer of information is required between the CIP and main memory. Later, the CIP may go into a stall mode while waiting for the information to be transferred. A grant signal RQGTCI— is received from main memory to indicate that the information transfer is completed. The stall mode is ended near the end of the grant signal starting the clock signal MCLOCK— to cycle.

The main memory indicates an error condition such as "no such memory address", an "out of segment" condition or a "ring protection violation" via signal LBUARR, LBUARL or LBPROV which causes an error flop to set after the fall of the clock signal MCLOCK— at the conclusion of the stall. The error flop signals BMYERF+ causes a 100 nanosecond stall to enable the hardware to change to an error sequence of firmware after which the clock signal MCLOCK— again starts to cycle.

DESCRIPTION OF THE PREFERRED EMBODIMENT

Figure 1:
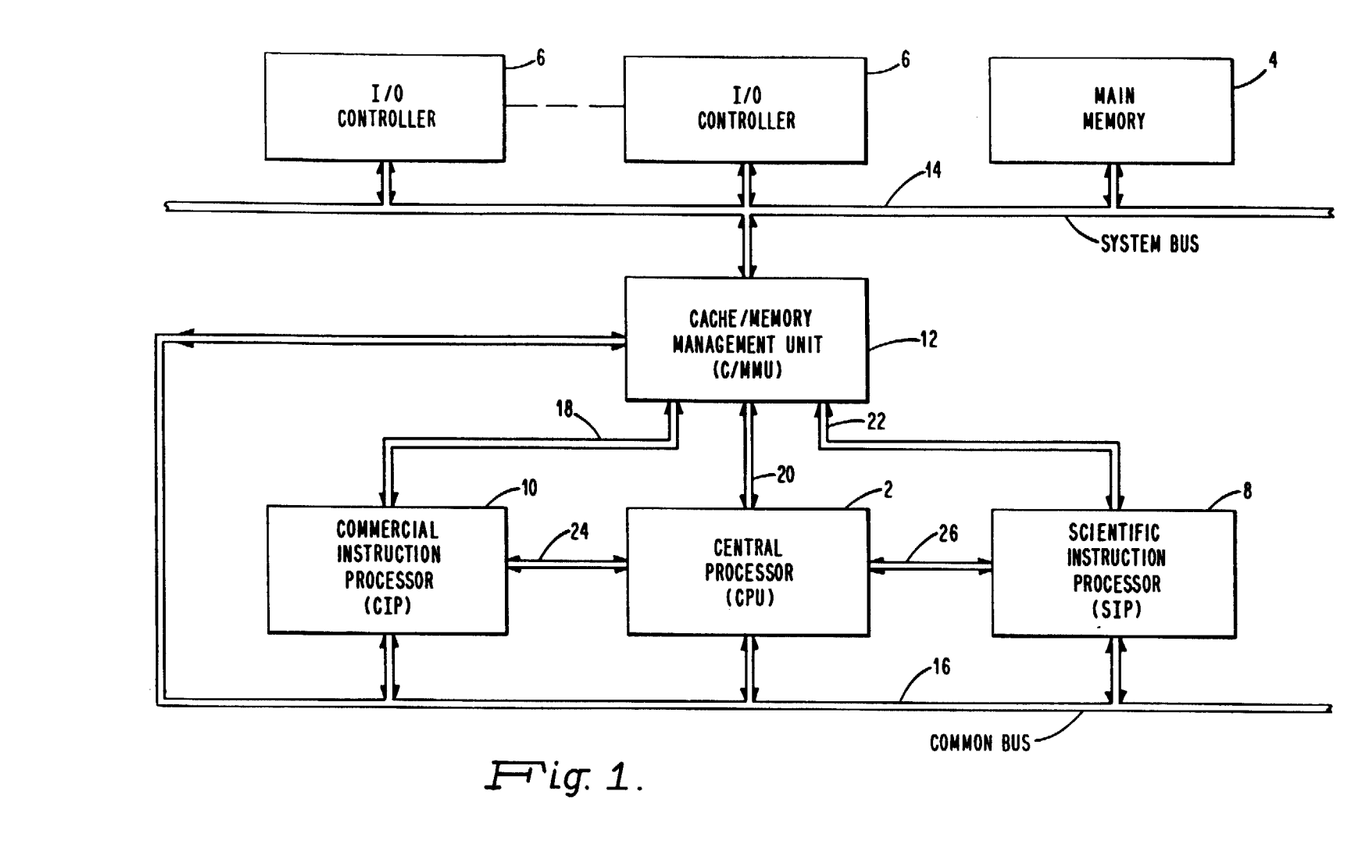
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22 respectively. The C/MMU 12, CIP 10, CPU 2 and SIP 8 are coupled in common to a common bus 16. Also, CPU 2 is coupled to the CIP 10 and the SIP 8 via buses 24 and 26 respectively.

The CIP 10 executes a set of instructions designed to facilitate the processing of character strings and decimal data. The SIP 8 executes a set of scientific instructions particularly useful for FORTRAN applications. This set includes arithmetic operations on single and double precision floating point operands and single and double word integer operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26 respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22 respectively and bus 16 for processing the instruction.

The CIP 10 processes instructions which include the following:

1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/O controllers 6 and main memory 4.

Figure 2:
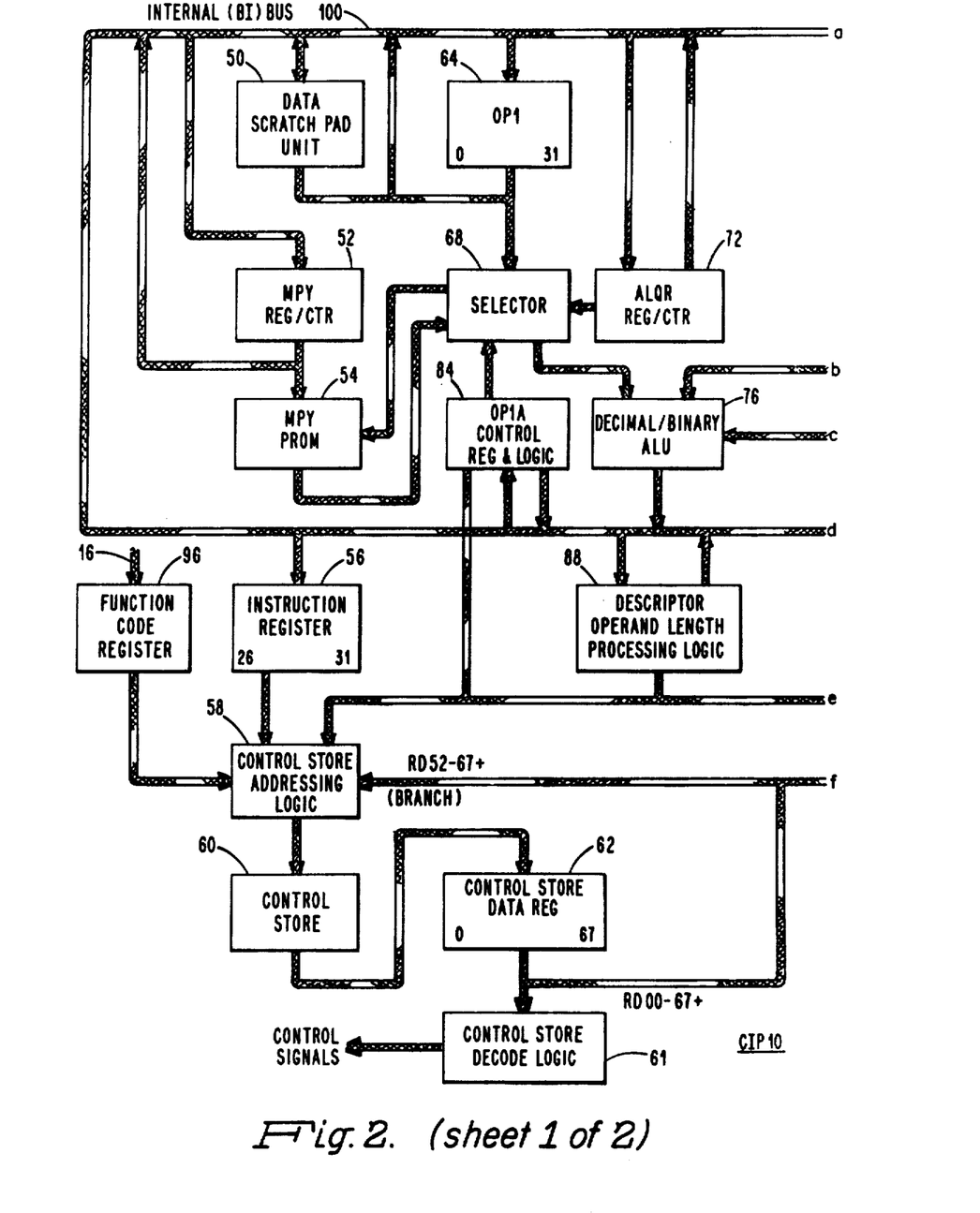
FIG. 2 is a block diagram of the commercial instruction processor 10.

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the low order 16 bits of the double word are stored in a portion of an address control unit 82 to allow the CPU 2 to request the previous instruction word at a later time.

The contents of function code register 96 select a firmware word in a control store 60 via control store addressing logic 58. The firmware word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 results in control store 60 branching to a specified address location.

The CIP 10 instructions operate on three data types, decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and, assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive signal or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decmial type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand. The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78 respectively. In addition, the length of operands 1 and 2 is stored in descriptor operand length processing logic 88. The operation of operand length processing logic is described in application Ser. No. 220,220 entitled "A Data Processor Using Read Only Memories for Optimizing Main Memory Access and Identifying the Starting Position of an Operand". The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operations of OP1A 84 and OP2A 78 are described in U.S. Pat. No. 4,384,340 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data Is Written".

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 via BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to a corresponding decimal digit stored in OP2 66 and the resultant partial product stored back in OP2 66.

The next multiplier digit is read into multiply register/counter 52 and the output applied to PROM 54. Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digit output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

A CIP indicator register 90 is set by the control signals to indicate the status of CIP 10. Register 90 includes an overflow indicator which is set during decimal operations when the receiving field cannot store all significant digits of the result or a divide by zero is detected. A truncation indicator is set during alphanumeric operations when the receiving field cannot contain all characters of the result. A sign fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises.

A system clock logic 86 includes a 160 nanosecond four phase clock that provides clock signals to trigger all CIP 10 registers and all test and control flops, stabilize registers after loading, signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate to CPU 2 that the CIP 10 is not available, receives a DCNCNI+ signal from the C/MMU 12 bus to signal the CIP 10 that data for the CIP 10 is on the common bus 8, generates a REQUEST for use of the common bus 16, and waits for a GRANT from the C/MMU 12.

The microprocessor status register 94 in addition to storing operand sign information also stores an indication if an overflow was detected in executing a decimal numeric instruction, whether an encode or a decode overpunched sign operation is required, and when a decimal add operation is completed.

Figure 3:
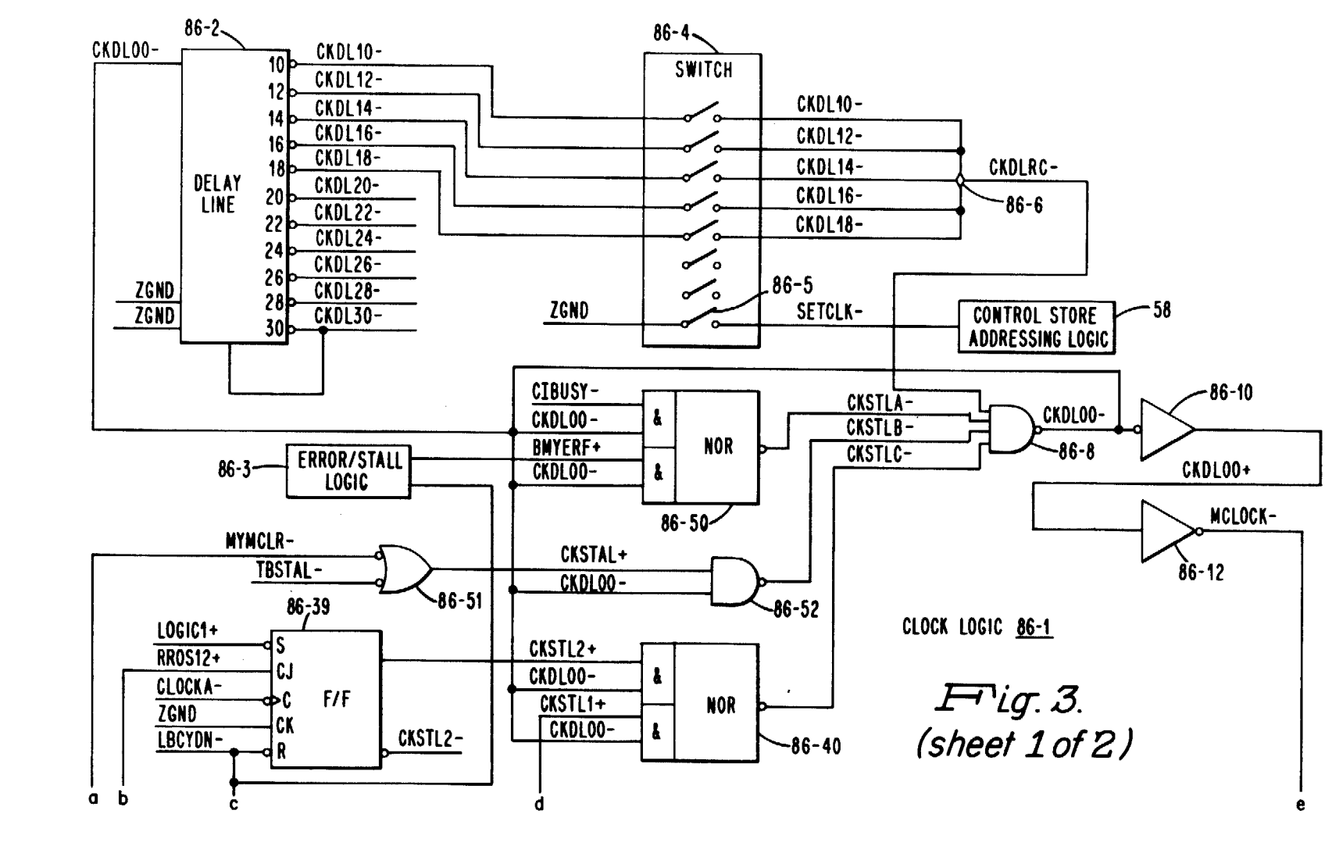
FIG. 3 shows the clock logic 86-1.

FIG. 3 shows a portion of the detailed system clock logic 86. A basic clock signal MCLOCK− timing is generated by selecting one or two adjacent output signals CKDL10−, CKDL12−, CKDL14−, CKDL16− and CKDL18− from a delay line 86-2. The signals are selected by a switch 86-4 and applied to a junction 86-6. An output signal CKDLRC− at logical ONE is applied to an input of a NAND gate 86-8 which generates output signal CKDL00− at logical ZERO. This forces the selected output signal of delay line 86-2 to logical ZERO, forcing the output signal CKDLRC− of junction 86-6 to logical ZERO. This forces CKDL00− to logical ONE. Signal CKDL00− cycles between logical ONE and logical ZERO thereby generating a free running square wave at a frequency selected by switch 86-4. Note that any one of the stall signals CKSTLA−, CKSTLB− or CKSTLC− at logical ZERO applied to NAND gate 86-8 will stall the basic clock by keeping signal CKDL00− at logical ONE.

Signal CKDL00− generates clock signal MCLOCK− through inverters 86-10 and 86-12. The switch positions of switch 86-4 are selected to generate the timing of clock signal MCLOCK− as a 40 nanosecond nominal square wave timing cycle, 20 nanoseconds at logical ONE and 20 nanoseconds at logical ZERO.

Clock signal MCLOCK− is applied to the clock terminals of flops 86-14, 86-16, 86-18, 86-19 and 86-20. The timing sequence is started during the master clear operation when the BSMCLR+ signal is received over common bus 16. Flop 86-18 is set and flops 86-20, 86-14 and 86-16 are reset by forcing the clear signal MYMCLR− to logical ZERO via inverters 86-34 and 86-36 and a driver 86-38. The master clear operation also forces signals CKDL00− and CKDLRC− to logical ONE since signal CKSTLB− is forced to logical ZERO via a NOR gate 86-51 and a NAND gate 85-52. Flop 86-18 setting forces output signal CLOCKC+ to logical ONE and output signal CLOCKC− to logical ZERO. At the conclusion of the master clear operation, clear signal MYMCLR− is forced to logical ONE. The return of the MYMCLR− signal to logical ONE causes signal MCLOCK− to fall via gates 86-51, 86-52, 86-8, 86-10 and 86-12. This falling MCLOCK− signal causes flop 86-20 to set and flop 86-18 to reset. Successive falls of clock signal MCLOCK− result in the sequence of successive setting and resetting of flops 86-14, 86-16, 86-18, 86-19, 86-20, etc. During non-stall operation, the sequential clock signals CLOCKA+, CLOCKB+, CLOCKC+ and CLOCK2+ are at logical ONE for 40 nanoseconds and at logical ZERO for 120 nanoseconds and provide the basic logic timing for the CIP 10 operation. The transition from signal CLOCK2+ to signal CLOCKA+ identifies the beginning of a control cycle which is the time at which the control store data register 62 is loaded. A flop 86-19 generates a clock signal CLOCK1+ which is at logical ONE for 80 nanoseconds when clock signal CLOCKA+ or CLOCKB+ is at logical ONE and is at logical ZERO for 80 nanoseconds when clock signals CLOCKA+ and CLOCKB+ are at logical ZERO.

Signal CKSTLA−, CKSTLB− or CKSTLC− at logical ZERO applied to NAND gate 86-8 stalls the CIP 10 clock by forcing signal CKDL00+ to remain at logical ONE.

The CIP 10 clock is stalled during the following operations:

1. During a system clear operation, signal BSMCLR+ is received via local bus 16. This results in the stall clock signal CKSTLB− from a NOR gate 86-51 being forced to logical ZERO via an inverter 86-34, signal LBMCLR−; an inverter 86-36, signal MYMCLR+; a driver 86-38, signal MYMCLR—; and NOR gate 86-51.

2. During a maintenance operation, when signal TBSTAL— at logical ZERO is applied to NOR gate 86-51 forcing stall clock signal CKSTLB— to logical ZERO as above.

3. During an information transfer between main memory 4 and CIP 10, a clock stall flop 86-27 sets on the rise of the CLOCKC+ signal when firmware signal MSTALL— from the control store decode logic 61 is at logical ZERO. A clock stall signal CKSTL1+ at logical ONE is applied to an AND/NOR gate 86-40, forcing clock stall signal CKSTLC— to logical ZERO. This prevents firmware from attempting to transfer information before it is received by the CIP 10. This stall is also used to keep the firmware from changing the main memory 4 address before the main memory 4 or cache is through using it.

4. During a firmware cycle, control store 60 signal RROS12+ at logical ONE (a common bus request firmware signal) causes flop 86-39 to set on the fall of clock signal CLOCKA—. Output signal CKSTL2+ at logical ONE applied to AND/NOR gate 86-40 forces clock stall signal CKSTLC— to logical ZERO. Flops 86-27 and 86-39 are reset on the fall of signal LBCYDN— from error/stall logic 86-3 to end the stall operation.

5. During the time required for the hardware to change the address of the next control cycle, the error signal BMYERF+ at logical ONE from error/stall logic 86-3, applied to an AND/NOR gate 86-50, forces clock stall signal CKSTLA— to logical ZERO.

6. During a control cycle when the CIP 10 is not busy, signal CIBUSY— is forced to logical ONE at the beginning of the control cycle. Signal CIBUSY— is applied to the AND/NOR gate 86-50 to force the clock stall signal CKSTLA— to logical ZERO.

The output signal SETCLK— of switch 86-4 which is applied to the control store addressing logic 58, FIG. 2, is used while adjusting the basic timing of CIP 10.

Figure 4:
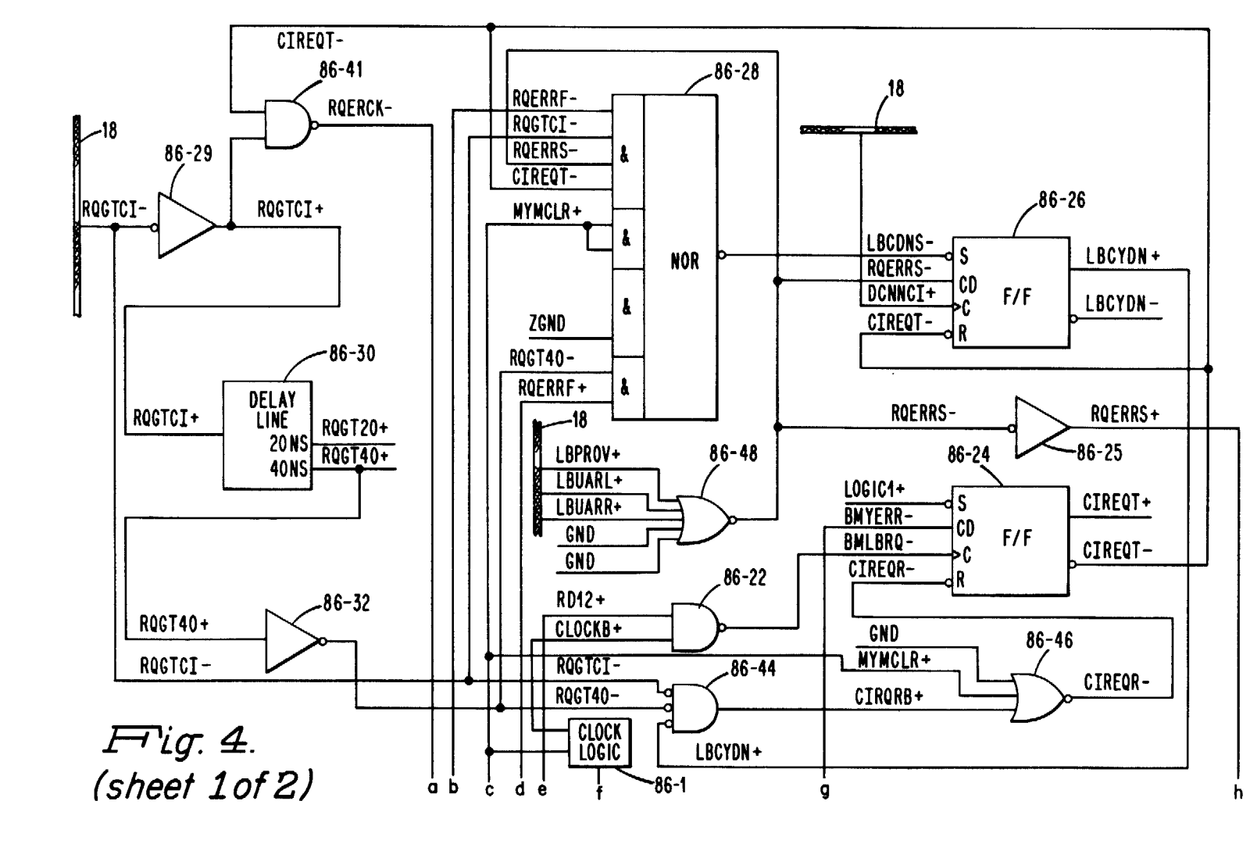
FIG. 4 shows the error/stall logic 86-3.

Referring to FIG. 4, the CIP 10 is placed in a stall mode while waiting for the completion of an information transfer between the CIP 10 and C/MMU 12 or main memory 4. The request for the information transfer in the CIP 10 is generated by the firmware. Signal RD12+ from the control store data register 62 at logical ONE is applied to a NAND gate 86-22 forcing output signal BMLBRQ— to rise on the fall of clock signal CLOCKB+. This sets a request flop 86-24. Request flop 86-24 output signal CIREQT— at logical ZERO is applied to the reset terminal of a local bus cycle done flop 86-26 and the input of an AND/NOR gate 86-28 forcing output signal LBCDNS— to logical ONE. The set input at logical ONE and the reset input at logical ZERO forces the flop 86-26 into a reset state forcing output signal LBCYDN+ to logical ZERO and output signal LBCYDN— to logical ONE.

Signal LBCYDN— at logical ONE conditions a stall flop 86-27, FIG. 3, to set on the rise of clock signal CLOCKC+ during a subsequent control cycle to the one with RD12— at logical ONE, provided control store decode logic 61, FIG. 2, firmware signal MSTALL— is at logical ZERO. This forces output signal CKSTL1+ to logical ONE, stalling the clock system logic 86, FIG. 2, as long as signal CKSTL1+ is at logical ONE by forcing the output signal CKDL00+ of NAND gate 86-8 to logical ONE via AND/NOR gate 86-40. This forces output signal CKSTLC— to logical ZERO.

When the information transfer between CIP 10 and C/MMU 12 and, if necessary, main memory 4 is permitted, a grant signal RQGTCI— at logical ZERO is received by CIP 10 at an inverter 86-29 from CIP/MMU bus 18, FIG. 2, to generate signal RQGTCI+ at logical ONE. This conditions common bus data interface 80, FIG. 2, to transfer information to main memory 4 over common bus 16 during a write to main memory 4 operation.

Signal RQGTCI+ is applied to the input of a delay line 86-30 to generate a signal RQGT40+, delayed 40 nanoseconds from signal RQGTCI+. Signal RQGT40+ is inverted by an inverter 86-32 to generate signal RQGT40—.

Since signals RQCTCI—, RQCT40— and LBCYDN+ are at logical ZERO, the output of a NAND gate 86-44, signal CIRQRB+, is forced to logical ONE. This forces the output of a NOR gate 86-46, signal CIREQR—, to logical ZERO which resets flop 86-24 forcing signal CIREQT— to logical ONE.

When the grant signal RQGTCI— from the CIP/MMU bus 18 is forced to logical ONE, indicating that the common bus 16 is no longer available to the CIP 10, and assuming all of the error signals LBPROV+, LBUARL+ and LBUARR+ are at logical ZERO, that is, no main memory 4 error, then signal LBCDNS—, the output of AND/NOR gate 86-28, is forced to logical ZERO. This sets flop 86-26 forcing output signals LBCYDN+ to logical ONE and LBCYDN— to logical ZERO and resetting stall flop 86-27, FIG. 3. Signal CKSTL1+ at logical ZERO forces output signal CKSTLC— from AND/NOR gate 86-40 to logical ONE. Clock signal CKDL00— is forced to logical ZERO, clock signal MCLOCK— is forced to logical ZERO via inverters 86-10 and 86-12, clock signal CLOCKC+ is forced to logical ZERO and clock signal CLOCK2+ is forced to logical ONE thereby completing the stall cycle of operation.

For the memory read operation, the connect signal DCNNCI+ is received from CIP/MMU bus 18, and clocks the information received from main memory 4 over common bus 16 into common bus data interface 80. Also, the local bus cycle done, flop 86-26 is set on the rise on the signal DCNNCI+. Signal DCNNCI+ rises approximately 60 nanoseconds before the grant signal RQGTCI— rises, thereby completing the stall cycle of operation approximately 60 nanoseconds sooner in the memory read operation then in the memory write operation.

If there was a main memory 4 error, that is "no such memory address" or an "out of segment" condition or "ring protection violation", one of the error signals LBPROV+, LBUARL+ or LBUARR+ received via bus 18 is stored in a register 86-42 at the end of the grant cycle on the rise of signal RQERCK—, thereby generating signal BMPROV+, BMUARL+ or BMUARR+. Signal RQERCK—, the output of a NAND gate 86-41, is generated after the request operation when signal CIREQT— is forced to logical ONE and signal RQCTCI+ falls to logical ZERO.

These errors are permitted to "blast out" of the normal control sequence only at the end of either a local bus request cycle (RD12+ at logical ONE) or an explicit stall-until-local-bus-cycle-done cycle (MSTALL— at logical ZERO). This condition is asserted by signal TSTERR+ at logical ONE (the result of either MSTALL− from the control store decode logic 61 at logical ZERO or signal RD12− generated by inverter 86-54 at logical ZERO on the inputs of NOR gate 86-56) being applied to AND/NOR gate 86-58. If signals BMPROV+ of register 86-42 and TSTERR+ are both at logical ONE, or if signal BMUARE+ (generated at logical ONE by gate 86-55, if either signal BMUARL+ or BMUARR+ of register 86-42 is at logical ONE), then the output of gate 86-58, signal BMYERS−, is at logical ZERO. This sets a flop 86-60 forcing signals BMYERR+ to logical ONE and BMYERR− to logical ZERO. A flop 86-62 is set on the rise of the signal CLOCKC− since signal BMYERR+ and the bypass error signal BYPSER− from mode register 92, FIG. 2, and applied to an AND gate 86-63, are at logical ONE forcing output signal BMYERB+ to logical ONE.

The output signal BMYERF+ from flop 86-62 is applied through delay lines 86-64 and 86-66 and an inverter 86-68 to generate signal BMYERD− at logical ZERO, delayed 100 nanoseconds from the rise of signal BMYERF+. Signal BMYERD− forces the output of a NOR gate 86-70, error clear signal ERFCLR+, to logical ONE. This forces the output of a NAND gate 86-72, error clear signal ERFCLR−, to logical ZERO which resets flop 86-62.

Signal BMYERF+ at logical ONE is applied to AND/NOR gate 86-50, FIG. 3, to again stall the clock when signal CKDL00− is at logical ONE by forcing clock stall signal CKSTLA− to logical ZERO. The clock is stalled for the 100 nanoseconds that signal BMYERF+ is at logical ONE, thereby allowing the control store 60 enough time to access the location containing the beginning of the error routine.

The parity error logic 86-63 generates signal INDPER− at logical ZERO which is applied to the CD terminal of flop 86-60 when a parity error is detected in the CIP 10. Flop 86-60 sets on the fall of the CLOCK2− signal when the firmware signal RD 8-11+ is applied to a NAND gate 86-61 forcing clock signal ULINRC− to rise.

The error indications stored in the CIP 10 are cleared when the firmware externally generates signal MERRCL− which is applied to a negative AND gate 86-74. The output signal BMERCL− at logical ZERO forces error clear signals ERFCLR− to logical ONE and ERFCLR+ to logical ZERO. Also the signal BMERCL− at logical ZERO resets flop 86-60 and forces signal BMYERS−, the output of AND/NOR gate 86-58, to logical ONE.

If an error condition is indicated by signals LBPROV+, LBUARL+ or LBUARR+ at logical ONE, then signal RQERRS−, the output of a NOR gate 86-48, is forced to logical ZERO. Signal RQERRS− is applied to an inverter 86-25. The output signal RQERRS+ is stored in register 86-42 on the rise of signal RQERCK−. Signal RQERRS− at logical ZERO prevents signal DCNNCI+ from setting flop 86-26. The register 86-42 output, signal RQERRF− at logical ZERO or signal RQERRS− at logical ZERO, is applied to the AND/NOR gate 86-28 and forces output signal LBCDNS− to logical ONE. This prevents the setting of flop 86-26 on the rise of the grant signal RQGTCI−. Signal RQERRF+ at logical ONE allows the end of grant, delayed 40 nanoseconds, signal RQGT40− to set flop 86-26. This delay in starting the clock allows flop 86-26 time to set. Signal CKSTL1+ at logical ZERO forces the output of AND/NOR gate 86-40, signal CKSTLC−, to logical ONE. This forces signal CKDL00+, the output of NAND gate 86-8, to logical ZERO. This results in clock signal MCLOCK− falling to logical ZERO, resulting in the fall of the CLOCKC+ signal and the rise of the CLOCK2+ signal since flop 86-18 is reset and flop 86-20 is set.

The master clear signal BSMCLR+, FIG. 3, generates signals MYMCLR− and MYMCLR+. The master clear signal received during the stall operation starts the MCLOCK− signal cycling in FIG. 3. Signal MYMCLR+ at logical ONE applied to NOR gate 86-24 causes the request flop 86-46 to reset since signal CIREQR− is forced to logical ZERO. Also, signal LBCDNS−, the output of AND/NOR gate 86-28, is forced to logical ZERO, setting flop 86-26. Signal LBCYDN− at logical ZERO resets stall flops 86-27 and 86-39 of FIG. 3. Signal MYMCLR− at logical ZERO applied to negative AND gate 86-74 forces the error clear signal BMERCL− to logical ZERO, resetting the error indications in CIP 10 as described supra.

Figure 5:
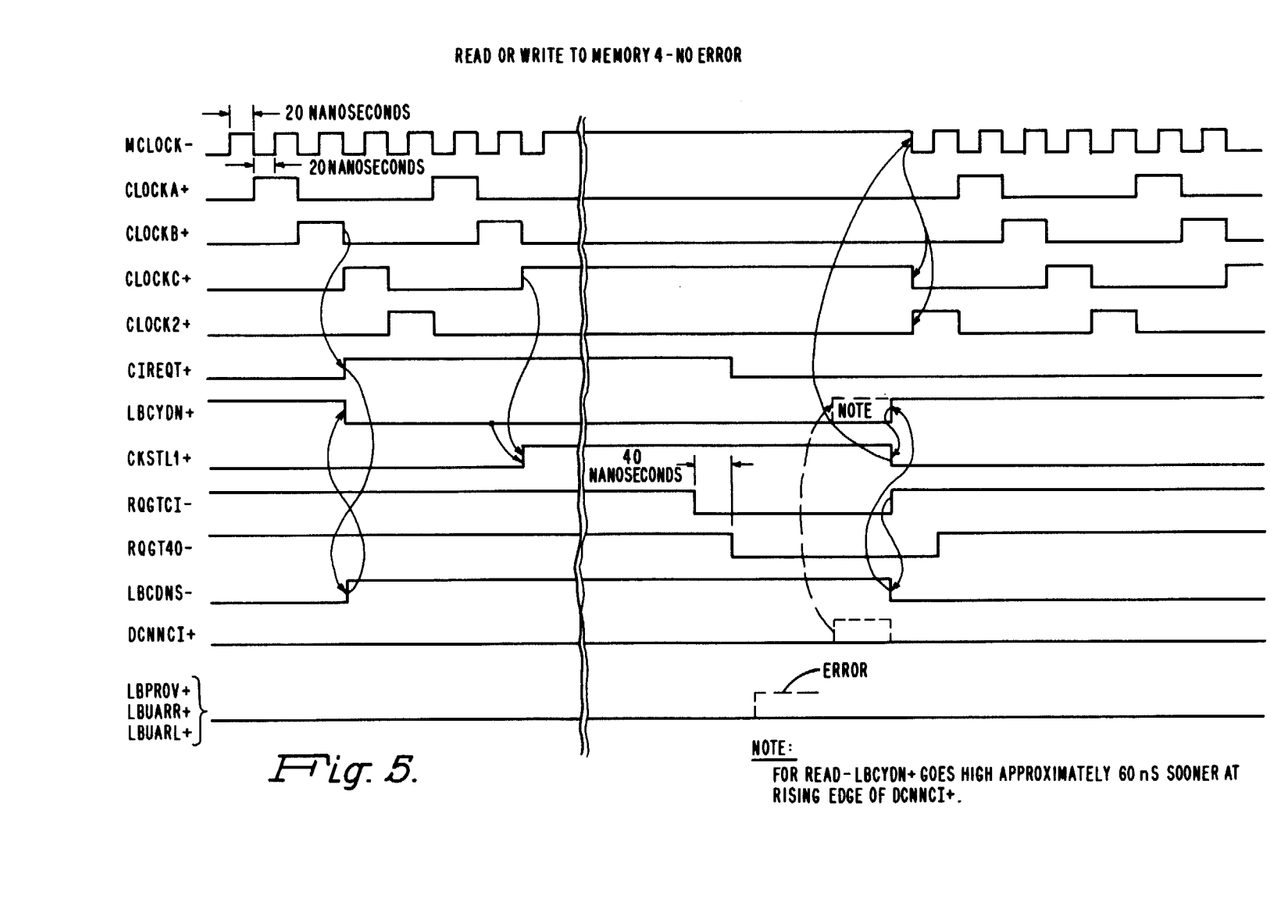
FIG. 5 is a timing diagram showing a data transfer stall.

FIG. 5 shows the logic timing of stalling the clock during a data transfer between the CIP 10 and main memory 4 without the CIP 10 receiving an indication from main memory 4 that an error condition was sensed.

Signal MCLOCK− shows the basic 40 nanosecond cycle clock which causes the normal CIP 10 operation to stall when held at logical ONE. Signals CLOCKA+, CLOCKB+, CLOCKC+ and CLOCK2+ control the timing of the normal CIP 10 operation. Note that signal CLOCK+ is at logical ONE during the stall operation which is concluded when CLOCK+ falls causing CLOCK2+ to rise.

The firmware stored in control store 60, FIG. 2, generates an RD12+ signal to indicate a main memory 4 transfer as shown by CIREQT+ high timed to the fall of CLOCKB+. Signal LBCDNS− high allows LBCYDN− to go low because signal CIREQT− is at logical ZERO. This conditions CKSTL1+ to rise on the rise of a later CLOCKC+. Signal RQGTCI− is forced low during the data transfer between main memory 4 and CIP 10, provided it remains low for 40 nanoseconds; it forces signal CIREQT+ low to reset the data transfer request. Signal LBCDNS− falls on the rise of RQGTCI− which causes LBCYDN− to rise. This completes the stall operation during the main memory 4 write operation by forcing CKSTL1+ to fall resulting in the fall of MCLOCK− which in turn starts the CIP 10 timing operation by causing CLOCKC+ to fall and CLOCK2+ to rise.

At the conclusion of the main memory 4 read operation, signal LBCYDN− is forced high on the rise of signal DCNNCI+ from main memory 4 via CIP/MMU bus 18 by resetting flop 86-26 approximately 60 nanoseconds before the rise of RQGTCI− resulting in the clock starting 60 nanoseconds sooner than in the main memory 4 write operation.

Figure 6:
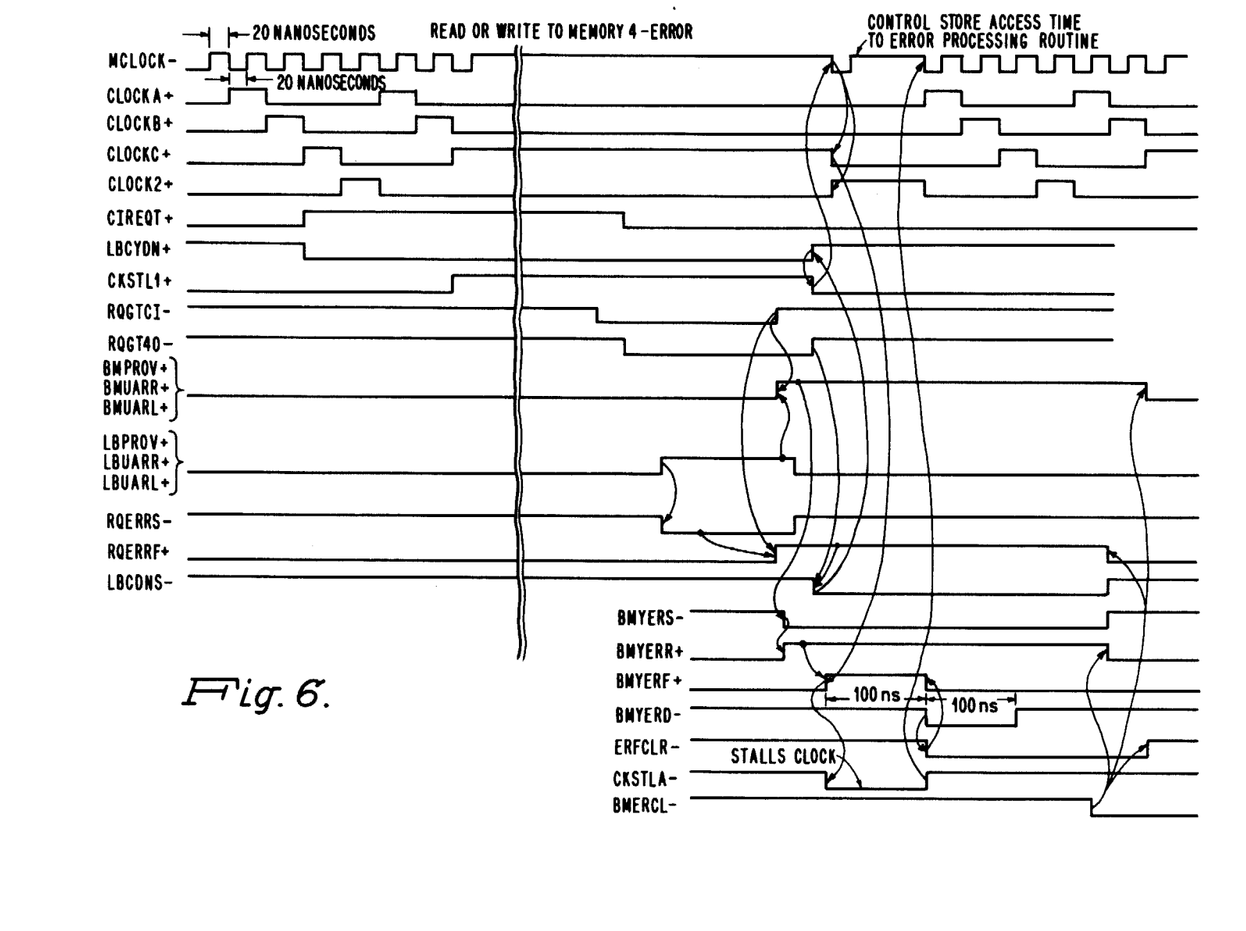
FIG. 6 is a timing diagram showing a data transfer stall with a memory error indication.

FIG. 6 shows the logic timing of stalling the clock during a data transfer between the CIP 10 and main memory 4 and a main memory 4 error is sensed. The CIP 10 receives signal LBPROV+, LBUARR+ or LBUARL+ high which forces signal RQERRS− low. Also the respective signal BMPROV+, BRUARR+ or BRUARL+ is forced high on the rise of signal RQGTCI−.

Signal BMYERS− is forced low by signal BMPROV+, BMUARR+ or BMUARL+ being high. Signal BMYERS− low forces signal BMYERR+ high. Signal CKSTL1+ is forced low as shown in FIG. 4 to allow signal MCLOCK− to go low forcing signal CLOCKC+ to fall and signal CLOCK2+ to rise. However, these actions are delayed until the rise of signal RQGT40− instead of signal RQGTCI− (or signal DCNNCI+ for reads). This delay allows signal BMYERR+ enough time to set up. BMYERF+ data input. Signal BMYERF+ goes high for 100 nanoseconds on the fall of CLOCKC+ causing CKSTLA− to fall stalling the clock for 100 nanoseconds while the CIP accesses the firmware error routine. At the end of the 100 nanoseconds, signal CKSTLA− is forced high to again start the clock. Signal BMYERD− is forced low by signal BMYERF+, delayed 100 nanoseconds, forcing signal ERFCLR− low which resets signal BMYERF+ low. When the error firmware routine is completed, signal BMERCL− is high forcing RQERRF− low, LBCDNS− high, BMYERS− high, BMYERR+ low and ERFCLR− high.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a memory subsystem for storing information and a commercial instruction processor (CIP) for executing decimal numeric instructions, both coupled to a common bus, said CIP comprising:

clocking system means for generating a plurality of timing signals for timing the logic elements of said CIP, wherein said clocking system means includes:
   delay line means for generating a square wave clock delay signal,
   NAND gate means coupled to said delay line means for generating an inverted square wave clock delay signal, said delay line means being responsive to and delaying said inverted square wave clock delay signal by a second predetermined period of time for generating said square wave clock delay signal, and
   timing means responsive to said inverted square wave clock delay signal for generating said plurality of timing signals;

means for stalling said clocking system means, for stalling said CIP during a transfer of said information between said memory subsystem and said CIP, said CIP being responsive to a grant signal from said memory subsystem for indicating that the transfer of said information is complete, said stalling means being responsive to said grant signal for enabling said clocking system means; and error processing means responsive to one of a plurality of error signals from said memory subsystem indicative of an error condition sensed during the transfer of said information for stalling said clocking system means after one clock cycle to enable said CIP to condition control store means for processing said error condition, said clocking system means again being enabled after a first predetermined period of time.

2. The system of claim 1 wherein said stalling means comprises:
first register means for generating a first signal indicating said information transfer is in progress;
second register means coupled to said first register means, said timing means and said control store means and responsive to said first signal, a first timing signal of said plurality of timing signals and a first control store signal for generating a first stall signal;
third register means coupled to said first register means, said timing means and said control store means and responsive to said first signal, a second timing signal of said plurality of timing signals, a second control store signal for generating a second stall signal; and
first gating means responsive to said first and second stall signals and said inverted square wave clock delay signal for generating a third stall signal, said NAND gate means being responsive to said third stall signal for stalling said clocking system means.

3. The system of claim 2 wherein said error processing means comprises:
error signal receiving means responsive to said one of said plurality of error signals for generating an error received signal in a first state; and
error stall means responsive to a third of said plurality of timing signals and said error received signal in said first state for generating an error stall signal in a first state.

4. The system of claim 3 wherein said stalling means further comprises:
second gating means responsive to said error stall signal in said first state and said inverted square wave clock delay signal for generating said fourth stall signal, said NAND gate means being responsive to said fourth stall signal for forcing said inverted square wave clock delay signal to said noncycling state for stalling said clocking system.

5. The system of claim 4 wherein said error processing means further comprises:
error clearing means responsive to said error stall signal in said first state after a predetermined delay for generating an error clear signal, said error stall means being responsive to said error clear signal for generating said error stall signal in a second state, said second gating means being responsive to said error stall signal in said second state for generating said fourth signal, said NAND gate means being responsive to said fourth signal for forcing said inverted square wave clock delay signal to said cycling state thereby enabling said clocking system means.

6. The system of claim 3 wherein said error signal receiving means comprises:
a register for storing said plurality of error signals;
a first AND/NOR gate responsive to said one of said plurality of error signals for generating a first error signal; and
a first flop resonsive to said first error signal for generating said error received signal in said first state.

7. The system of claim 6 wherein said error stall means comprises:
a second flop responsive to said third of said plurality of timing signals and said error received signal in said first state for generating said error stall signal in said first state.

8. The system of claim 5 wherein said first register means comprises:
a NOR gate responsive to said one of said plurality of error signals for generating a second error signal;

a second AND/NOR gate responsive to said grant signal and said second error signal for generating a second signal; and a third flop responsive to said second signal for generating said first signal, or further responsive to said second error signal and a bus signal for generating said first signal.

* * * * *